(No Model.)
A. CLEVELAND.
BASKET CARRIER.
No. 445,283.                   Patented Jan. 27, 1891.
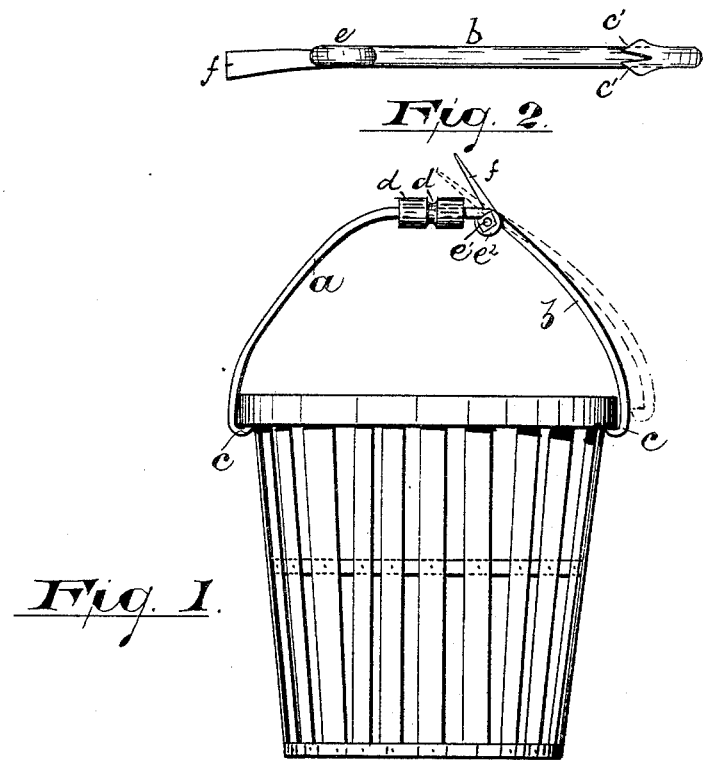
Witnesses
Oscar A. Michel
Jas H Fleming
Inventor
Arthur Cleveland
By Drake & Co Attys

UNITED STATES PATENT OFFICE.

ARTHUR CLEVELAND, OF LYONS FARMS, NEW JERSEY.

BASKET-CARRIER.

SPECIFICATION forming part of Letters Patent No. 445,283, dated January 27, 1891.

Application filed September 5, 1890. Serial No. 364,021. (No model.)

*To all whom it may concern:*

Be it known that I, ARTHUR CLEVELAND, a citizen of the United States, residing at Lyons Farms, in the county of Union and State of New Jersey, have invented certain new and useful Improvements in Basket Carriers or Handles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a convenient and an effective adjustable handle or carrier for peach and other fruit or vegetable baskets which have no permanent handles connected therewith, capable of being attached thereto or detached therefrom in a moment, whereby such a basket may be conveniently carried in one hand, and also possessing other advantages, hereinafter mentioned.

The invention consists in the improved handle or carrier, and in the combination and arrangement of the several parts thereof, as herein set forth, and finally pointed out in the claim.

Referring to the accompanying drawings, in which similar letters of reference indicate corresponding parts in each figure where they occur, Figure 1 represents in elevation an ordinary peach-basket with my improved carrier attached thereto. Fig. 2 is a view of one of the arms of said carrier inverted, showing certain gripping-teeth.

In said drawings, $a$ $b$ indicate the arms of the bail, $c$ the grippers, and $d$ a hand-piece. The bail I usually make of wire large enough to sustain the weight intended to be carried, which, as indicated in Fig. 1, may be in two parts, in which case one part or arm is bent so as to form an eye $e$ and a tail-piece $f$, the other part being also bent to form an eye or a hook $e^2$ near one end of the hand-piece. Through these is passed a cylindrical bolt $e'$, which forms a pivot or a hinge joint, whereby the carrier is rendered adjustable and capable of fitting baskets of different sizes. If preferred, however, the bolt may be dispensed with by forming the hook itself so as to pass through and hook into the eye, and thereby subserve the same purpose, as will be understood. The lower extremities of the arms are bent inwardly to form grippers $c$, which are divided at their ends, each terminating in two sharp gripping-teeth $c'$, as indicated in Fig. 2, whereby they will automatically penetrate and grip the sides of a basket which has no projecting rim, which is sometimes the case, with sufficient tenacity to hold it. Without such teeth in such cases the carrier would slip off, as will be manifest.

The hand piece $d$, which I usually make of wood, is provided at the center with a groove $d'$, for the purpose of receiving a hook and preventing it from slipping in cases where a basket is suspended from the branch of a tree while being filled with fruit, as is frequently done, an ordinary S-shaped hook being commonly used for the purpose.

Having thus described my invention, what I claim as new, and desire to secure by Letters Patent of the United States, is—

The herein-described basket-carrier, consisting of the arms $a$ and $b$, having the claws or hooks $c$, the arm $b$ having an eye $e$ and tail-piece $f$, and the arm $a$ having an eye $e^2$, a pivot $e'$ passing through the eyes, and a handle $d$, all arranged and adapted to serve as described.

In testimony that I claim the foregoing I have hereunto set my hand this 30th day of August, 1890.

ARTHUR CLEVELAND.

Witnesses:
OLIVER DRAKE,
OSCAR A. MICHEL.